Jan. 1, 1957

W. R. REED 2,775,903

ADJUSTABLE GEARING

Filed June 4, 1953

INVENTOR.

Wade R. Reed

BY Victor J. Evans & Co.

ATTORNEYS

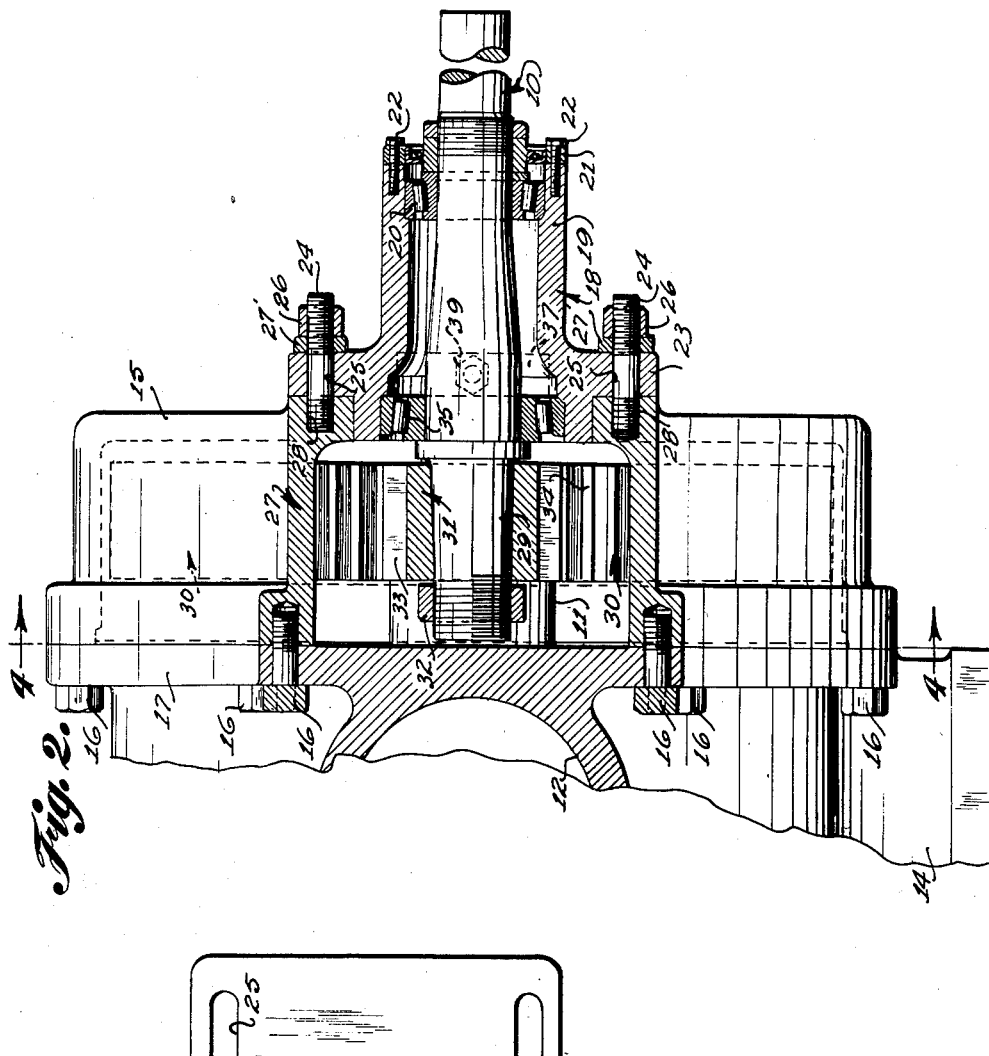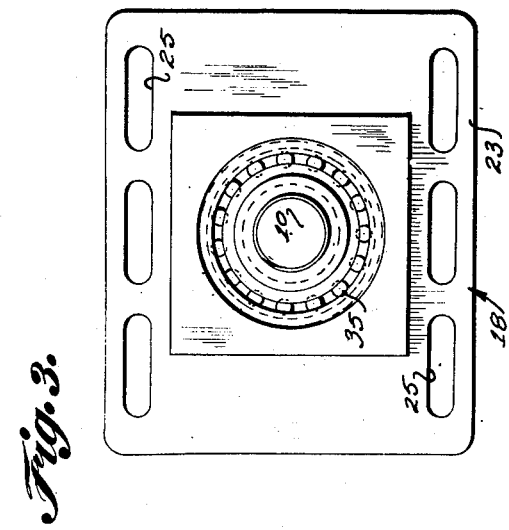

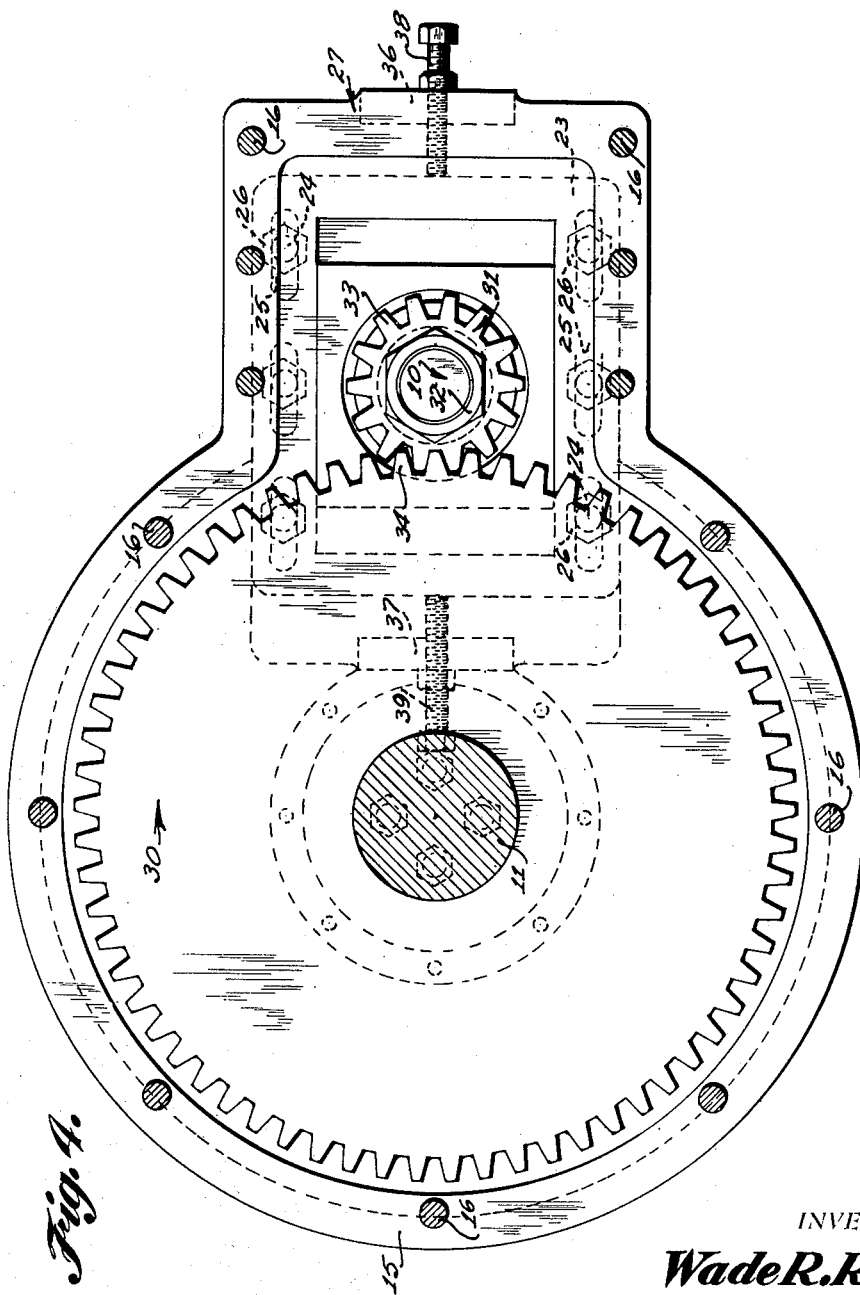

United States Patent Office 2,775,903
Patented Jan. 1, 1957

2,775,903
ADJUSTABLE GEARING
Wade R. Reed, Tulsa, Okla.

Application June 4, 1953, Serial No. 359,496

3 Claims. (Cl. 74—397)

This invention relates to a transmission, and more particularly to a transmission for permitting variation in speeds between a drive shaft and a crankshaft.

The object of the invention is to provide a transmission which will enable the speed of crankshafts or output shafts to be varied as desired.

Another object of the invention is to provide a speed changing arrangement for use in a motor or engine driven reciprocating pump such as a pump used for pumping oil into a pipe line gathering system, the present invention making possible a wide range of gear ratios to suit various engines and motors that are used to drive the pumps.

A further object of the invention is to provide a variable speed transmission which is extremely simple and inexpensive to manufacture.

Other objects and advantages will be apparent during the course of the following description.

In the accompanying drawings, forming a part of this application, and in which like numerals are used to designate like parts throughout the same:

Figure 2 is a sectional view taken on the line 2—2 of Figure 1.

Figure 3 is an end elevational view of the body member, with the gears removed.

Figure 4 is a sectional view taken on the line 4—4 of Figure 2.

Figure 1:
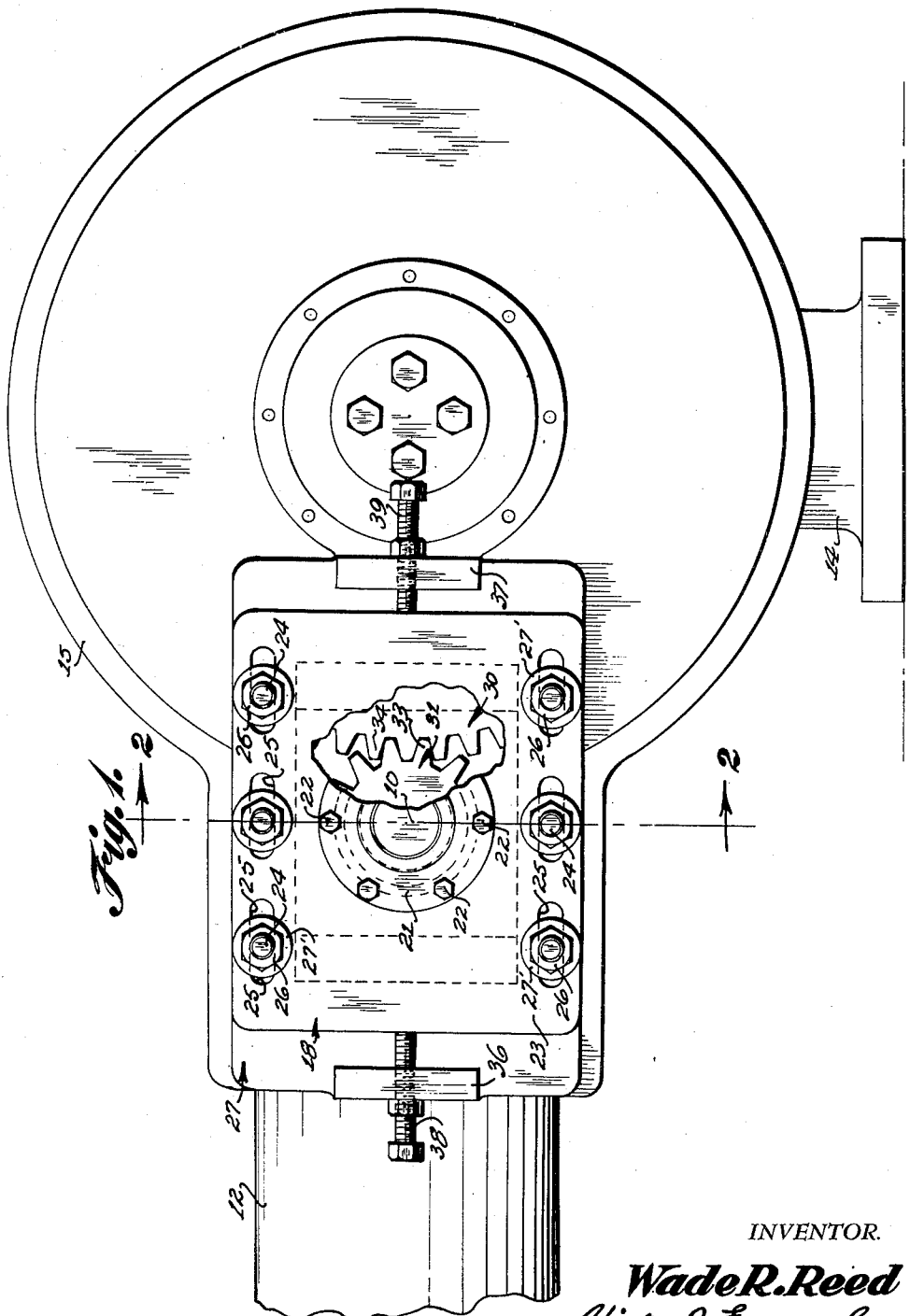
Figure 1 is a side elevational view of the present invention, with parts broken away and in section.

Referring in detail to the drawings, the numeral 10 designates a drive shaft which is adapted to be connected to a suitable source of power such as a motor or gasoline engine, and the numeral 11 designates a crankshaft which is adapted to be connected to one or more pistons that operate in cylinders 12. The pistons which operate in cylinders 12 may be part of a conventional pumping system for pumping gasoline, gas or the like. The present invention is directed to a variable speed transmission for connecting the drive shaft 10 to the crankshaft 11 whereby the speed of rotation of the crankshaft 11 can be varied as desired.

The transmission is supported on a base 14, and a hollow housing 15 is secured to a flange 17 by suitable bolt and nut assemblies 16, Figure 2. The flange 17 may be formed integral with or secured to the cylinder walls 12.

The numeral 18 designates a sliding or shifting body member which is provided with a hub 19 through which the drive shaft 10 extends. A bearing race 20 is positioned in the hub 19 and is circumposed on the shaft 10, and a cap plate 21 is connected to the hub 19 by suitable securing elements such as bolts or screws 22.

The body member 18 further includes a rectangular plate portion 23, and the plate portion 23 is provided with a plurality of elongated slots 25 for a purpose to be later described. A bolt 24 extends through each of the slots 25 and the inner end of each of the bolts 24 is arranged in threaded engagement with an aperture 28 in a casing 27. A nut 26 is arranged in threaded engagement with the outer end of each of the bolts 24, and a washer 27' is circumposed on each of the bolts 24. The screws or bolts 22 serve to connect the cap plate 21 to the hub 19. By loosening the nuts 26, the slots 25 in the plate portion 23 of the sliding body member 18 permit the body member 18 to be shifted so that the shaft 10 can be moved towards and away from the crankshaft 11. Thus, when different size pinion gears are mounted on the tapered portion 29 of the drive shaft 10, the drive shaft 10 can be moved toward and away from the crankshaft 11 so as to insure that the pinion gear on the tapered portion 29 meshes with the ring gear 30 that is connected to the crankshaft 11. As shown in Figure 2 a pinion gear 31 is mounted on the tapered portion 29 of the drive shaft 10, and the pinion gear 31 is held in place by means of a nut 32 which is threaded on the inner end of the shaft 10. The pinion gear 31 may be provided with a plurality of teeth 33 which mesh with teeth 34 of the ring gear 30 which is secured to the crankshaft 11. A ball bearing race 35 is spaced from the ball bearing race 20, and the ball bearing race 35 is circumposed on the drive shaft 10.

A means is provided for adjusting the position of the sliding body member 18 after the nuts 26 have been loosened and this means also serves to maintain the body member immobile in its various adjusted positions. This means comprises a pair of lips or ears 36 and 37 which extend outwardly from the casing 27 and are secured thereto or formed integral therewith. A bolt 38 is arranged in threaded engagement with the lip 36, while a similar bolt 39 is arranged in threaded engagement with the other lip 37, the bolts 38 and 39 abutting or engaging the opposite end of the shifting body member 18.

The drive shaft 10 may be connected to an engine or motor by a flexible coupling and when the engine is actuated the drive shaft 10 will be rotated to cause rotation of the pinion gear 31. The teeth 33 of the pinion gear 31 mesh with the teeth 34 of the gear wheel 30 and the gear wheel 30 is connected to the crankshaft 11. The crankshaft 11 may be connected to piston rods of a gas pump so that as the drive shaft 10 rotates the pump will cause fluid or gas to be pumped or circulate. In order to vary the speed of rotation between the drive shaft 10 and the crankshaft 11, the unit can be disassembled and the pinion gear 31 replaced with a different sized pinion gear. Then, the nuts 26 can be loosened and the body member 18 shifted by virtue of the slots 25 in the plate portion 23. After the body member 18 has been shifted to the desired location, the nuts 26 are again tightened to maintain the body member immobile in its adjusted position. The adjustment of the body member is accomplished by rotating the bolts 38 and 39 and this adjustment is necessary in order to bring the teeth of the pinion gear that is mounted on the tapered portion 29 into mesh with the teeth 34 of the ring gear 30. Thus, since different sizes of pinion gears will be used, it is necessary that there be an adjustment to insure that the teeth of the pinion gear always mesh with the teeth of the ring gear 30.

The transmission of the present invention can be used in various apparatus such as in pumps for use in crude oil gathering lines and booster stations, water lines, salt water disposal, flush pumps and acidizing service. The crankcase may be provided with oil or lubrication to lubricate the various gears, crossheads and connections. Also, the speed changer of the present invention can be applied to other drive mechanisms besides reciprocating pumps. The speed changing arrangement of the present invention, however, is especially suitable for motors for engine driven reciprocating pumps, such as those used for normally pumping oil into pipe line gathering systems. Heretofore such pumps have been driven by a portable engine or electric motor through a "V-belt drive," and the gears which are built into the pumps are fixed so that the only variation in speed to suit the different engine and motor speeds is accomplished by the V-belt drive. According to the present invention the drive shaft 10 is connected directly to the engine or motor for driving the pump through its flexible coupling to thereby eliminate the V-belt drive. Various sizes of pinion gears 31 can be used to obtain a wide range of gear ratios to suit various engines and motors used to drive the pump. When smaller pinions are utilized, it may be necessary to cut such pinions integrally with the drive shaft 10. The larger pinions can be made separate from the shaft and held in place on the tapered portion 29 by the nut 32. These pinions may vary from approximately 2¼ inches pitch diameter having 16 teeth, to 5½ inch pitch diameter having 36 to 38 teeth so that there will be provided a wide number of speed changes merely by fitting the desired pinion and sliding the housing or body member 18 to the proper position. The gear adjustment is accomplished by means of the jack screws or bolts 38 and 39.

I claim:

1. In a variable speed transmission for a pump, a housing, a crankshaft positioned in said housing, a gear wheel connected to said crankshaft, a casing extending from said housing, a body member slidably connected to said casing, a drive shaft carried by said body member and adapted to be connected to a power source, gear means connecting said drive shaft to said crankshaft, said body member being provided with a plurality of spaced elongated slots, securing elements extending through said slots and into engagement with said casing, said gear means comprising a gear wheel connected to said crankshaft, a pinion gear meshing with said gear wheel and detachably mounted on said drive shaft, an inner portion of said drive shaft being tapered for receiving said pinion gear, and means for adjusting said body member, said last named means comprising a pair of spaced parallel lips extending from said casing, and securing elements arranged in engagement with each of said lips and abutting said body member.

2. A variable speed transmission comprising a base provided with a flange, a hollow housing secured to said flange, a drive shaft adapted to be connected to a power source, a crankshaft adapted to be connected to pistons movable in cylinders, a sliding body member provided with a hub for the projection therethrough of said drive shaft, a bearing race positioned in said hub and circumposed on said drive shaft, a cap plate detachably connected to said hub, said body member including a rectangular plate portion, said plate portion being provided with a plurality of elongated slots, a casing provided with a plurality of apertures, securing elements extending through said slots and into said apertures, said drive shaft including an inner tapered portion, a pinion gear mounted on said tapered portion, a ring gear secured to said crankshaft and having teeth meshing with the teeth on said pinion gear, a ball bearing race circumposed on said drive shaft, a pair of spaced parallel lips extending outwardly from said casing and secured thereto, and securing elements arranged in threaded engagement with each of said lips and abutting opposite ends of said sliding body member.

3. In a variable speed transmission for a pump, a housing, a crankshaft positioned in said housing, a gear wheel connected to said crankshaft, a casing extending from said housing, a body member slidably connected to said casing, a drive shaft carried by said body member and adapted to be connected to a power source, gear means connecting said drive shaft to said crankshaft, said body member being provided with a plurality of slots, securing elements extending through said slots and into engagement with said casing, said gear means comprising a gear wheel connected to said crankshaft, a pinion gear meshing with said gear wheel and detachably mounted on said drive shaft, and means for adjusting said body member, said last named means comprising a pair of lips extending from said casing, and securing elements arranged in engagement with each of said lips and abutting said body member.

References Cited in the file of this patent

UNITED STATES PATENTS

| | | |
|---|---|---|
| 1,297,462 | Hallenbeck | Mar. 18, 1919 |
| 1,720,971 | Schweich | July 16, 1929 |
| 1,740,810 | Davies | Dec. 24, 1929 |
| 2,436,746 | Drought | Feb. 24, 1948 |